Figure 1:
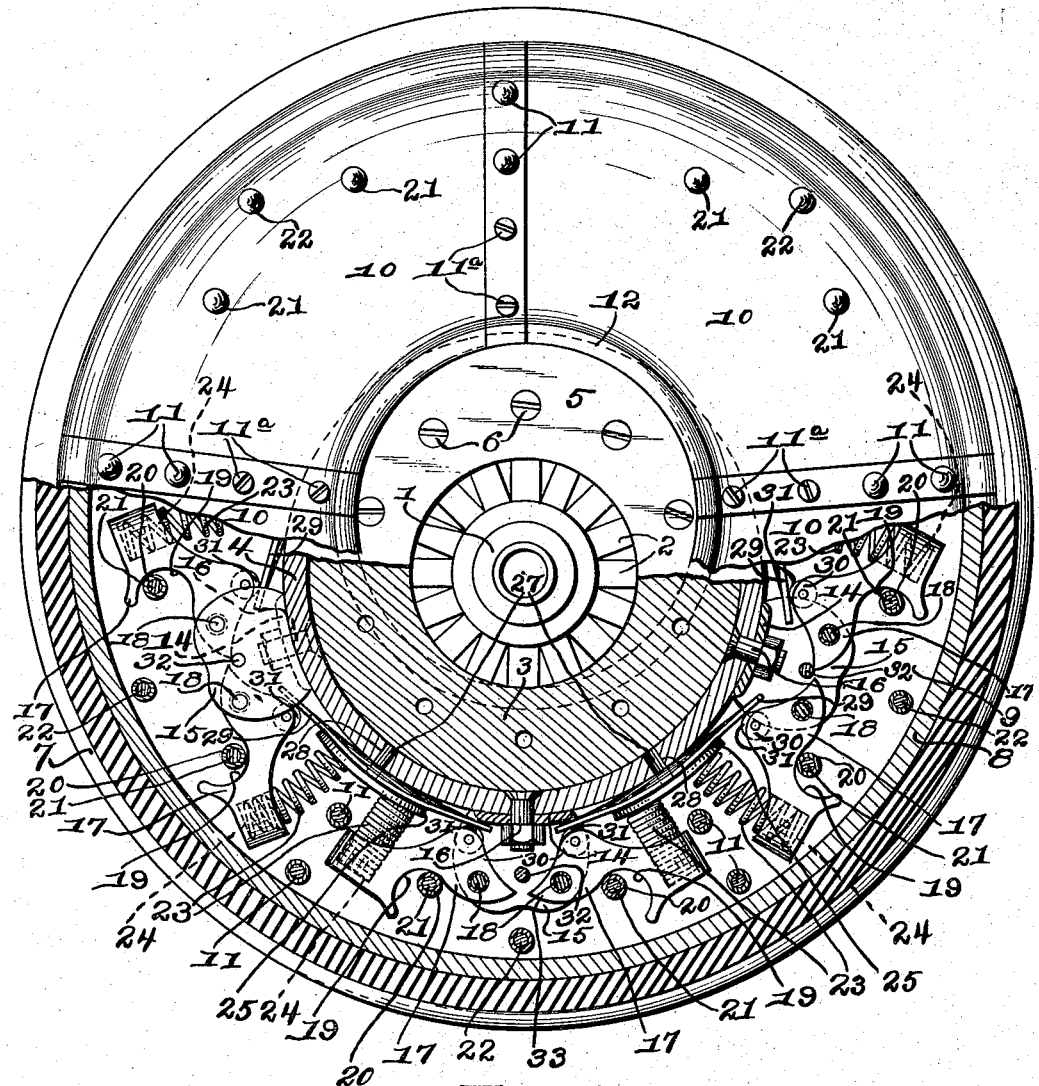

W. W. WILLSON.
RESILIENT WHEEL.
APPLICATION FILED AUG. 5, 1915.

1,166,566.

Patented Jan. 4, 1916.
2 SHEETS—SHEET 1.

Inventor
William W. Willson
By Wm H. Babcock & Son
Attorneys

W. W. WILLSON.
RESILIENT WHEEL.
APPLICATION FILED AUG. 5, 1915.
1,166,566.
Patented Jan. 4, 1916.
2 SHEETS—SHEET 2.
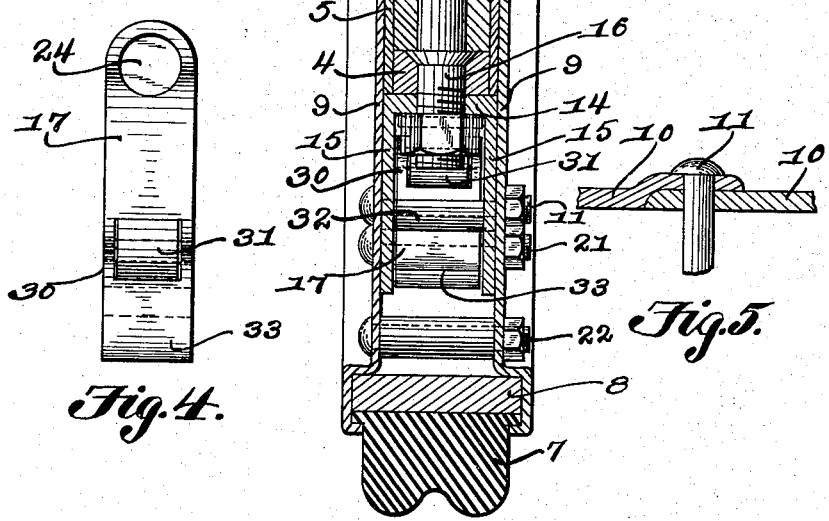

UNITED STATES PATENT OFFICE.

WILLIAM W. WILLSON, OF GAHANNA, OHIO.

RESILIENT WHEEL.

1,166,566.  Specification of Letters Patent.  Patented Jan. 4, 1916.

Application filed August 5, 1915. Serial No. 43,757.

*To all whom it may concern:*

Be it known that I, WILLIAM W. WILLSON, a citizen of the United States, residing at Gahanna, in the county of Franklin and State of Ohio, have invented certain new and useful Improvements in Resilient Wheels, of which the following is a specification.

This invention relates to resilient wheels consisting of an outer or tire portion, an inner or hub and rim portion and resilient devices in the annular space between said portions for taking up the shock of obstacles encountered by the wheel and permitting the latter to run evenly and easily.

The chief objects of this invention are to insure accuracy, durability and simplicity in the working parts, especially the resilient devices, to provide convenient and satisfactory means for attaching the springs and levers to the inner portion of the wheel; to guard these devices effectually against the intrusion of dust, moisture and other foreign matters; and to improve various details of construction and combination all as hereinafter more particularly set forth and claimed.

In the accompanying drawings: Figure 1 represents a side elevation, partly in section and broken away, of a wheel embodying my invention, the parts thereof being in the positions taken by them when the wheel encounters a considerable obstacle in the road; Fig. 2 represents an enlarged cross section of the outer part of the wheel approximately on the radial line of the lowest spoke, as shown in Fig. 1, and one of the bolts 16, hereinafter described, below said spoke, the said spoke and bolt being shown in elevation. Fig. 3 represents a detail view of one of the lever holding brackets; Fig. 4 represents a detail plan view, enlarged, of one of the cam levers; Fig. 5 represents an enlarged sectional view of the overlapping edges of two contiguous sections of the outer casing, one of the fastening bolts being shown in elevation; Fig. 6 represents an enlarged detail perspective view of one of the yoke plates or base plates for holding the springs; and Fig. 7 represents in side elevation an enlarged detail view of one of the leaf springs.

The hub 1 and spokes 2 of the wheel may be of any construction consistent with proper size and strength. They carry a felly 3, having a metallic rim 4, said felly and rim being protected on both sides by smooth annular side plates 5. Each side plate is fastened to the felly by screws 6. As shown in Fig. 2, some of these screws also enter the spokes from opposite sides, holding them more securely. Said screws maintain the correct position of said spokes, felly, and plates with relation to each other.

The hub, spokes, felly, rim and side plates make up the inner or hub portion of the wheel.

The rubber cushion tire 7, its metallic rim 8 and the outer casing 9 making up the outer portion of the wheel; the two portions of the wheel above named being movable toward or from each other. The weight on the axle of course tends to force the inner or tire portion downward; but is normally withstood by the springs hereinafter described and which are calculated accordingly, so that under normal conditions the inner portion would be but very slightly eccentric to the outer or tire portion. Any inequality of surface in the road will tend to force upward the lower part of the outer portion of the wheel against the resistance of said springs and if considerable will cause the parts to assume the position illustrated in Fig. 1.

The outer casing consists of two parallel walls each composed of a series of segmental sections 10, which overlap at their proximate edges, being detachably fastened together by bolts 11, passing through both of said plates near their outer peripheries and screws 11$^a$ near their inner peripheries, passing through the ends of each two adjacent plates where they overlap, but not through the space between the annular walls, as is the case with bolts 11. Equivalent means of fastening for the bolts 11 and screws 11$^a$ may be substituted for convenience in manufacture or replacement. The outer parts of said plates or walls are bent to form channels receiving a part of the rubber tire and its immediate rim 8 to hold the same in position after the manner of the clencher type of rim. The inner edge of each of said walls or plates, surrounding a central opening, is provided with an annular packing groove 12 filled with packing 13, preferably of circular form in cross-section, arranged for contact with the corresponding side plates 5 of the inner section of the wheel. Whatever the relative position of the two portions of the wheel, the two packing rings 13 are always in contact with the outer faces of the two side plates 5 and effectually prevent dust, moisture and foreign matter from entering the space between the inner portion of the wheel and the outer portion thereof and injuring or impeding the action of the resilient devices arranged within said space. These consist mainly of a circular series of pairs of cam-levers and of springs bearing radially and directly thereon, each cam-lever being arranged in proximity to a lever of the next pair (though not connected thereto) and the resilient strain will be distributed around the lower part of the wheel. To this end applicant provides, at convenient intervals around the rim 4 of the inner portion of the wheel, brackets 14 each consisting of a base plate and two parallel radially extending walls 15 and fastened detachably to said rim, preferably by a small bolt 16 passing through said rim and base plate. A pair of cam-levers 17 are mounted near their proximate ends on transverse pivots 18 in opposite sides of said brackets, and extend in opposite directions from each other, their position being nearly in line with the circuit of rotation when their springs are under the greatest tension, but more or less oblique in approach toward a radial position when the tension is less, as shown in Fig. 1. Each of these cam-levers is provided with a curved recess 19 in its outer side which fits on a roller 20 carried by a bolt 21 transverse of the external casing and fastened to its two side walls, passing at each side through one of the segmental sections. Additional bolts 22 are passed similarly through said side walls, there being three such bolts (two bolts 21 and one bolt 22) for each of said sections 10, to hold said side walls securely in place; but the rollers 20—one for each cam-lever—are the only working parts held to the casing. These rollers also serve as spacers to prevent the said walls from being drawn too far inward and toward each other. The said recesses 19 are so shaped and the said rollers 20 are so arranged with regard to them and the pivots 18 that any pressure of the inner portion of the wheel toward the lower part of the outer portion, such as is constant by reason of the weight on the axle, or of the lower part of the outer portion of the wheel upward toward said inner portion, will tend to compel the turning of each of the lower cam-levers 17 toward the position of greatest tension, the roller 20 riding along the wall of the recess and serving as a fulcrum for said lever, in each instance. This pivotal or rocking movement of the lever is resisted by the spring-pressure which makes the wheel resilient. Such pressure may be applied by any convenient form of spring and at any point of the lever which will provide such resistance. Applicant has illustrated as a preferred form a helical spring 23, the outer end of which fits into a socket 24 formed in the inner face of the end of the lever away from its pivot 18. As the proximate levers of two brackets approach each other at these ends, a single base-plate or yoke plate 25 provided with two sockets 26 (see Fig. 6) may be employed as a bearing and a holding device for their springs. The said yoke plate or base plate is attached to the rim 4 of the inner portion of the wheel. This attachment may be by a central stem 27 tightly fitted into a hole or recess 28 of said rim, as shown, or by any other suitable and convenient means of fastening. There are as many of these plates as of said brackets and they are arranged alternately therewith in annular series. A leaf spring 29, fastened at its middle to said rim 4 by said base-plate 25 and said stem 27 and bearing at each end against one of said levers, will perform the same function as a pair of said spiral springs. It may also be used, as shown, in coöperation therewith. To permit such action of said leaf or flat springs, each cam lever 17 is provided with a cam-face 30 arranged opposite a point between the pivot 18 and the roller 20 of said lever. It also carries on said cam an antifriction roller 31, which is in contact with said spring. The action of this spring 29 in opposing roller 20 is the same as that of the helical spring previously described, apart from difference of leverage.

Each bracket 14 has a transverse stop rod 32 connected at its ends to the two side plates 15 in the middle part of each and acting as a stop for the proximate ends of the two cam-levers 17 pivoted in said bracket as stated, each of these levers having a horn 33 extending in this direction beyond said pivot, with a concave inner face arranged for contact at the tip with the outer face of said stop pin, there being space for both horns of the said pair of levers to thus engage. This pin establishes the extreme limit of pivotal movement for any lever under the action of the spring or springs, and all the cam levers which are not under pressure through rollers 20 sufficiently to overcome said springs remain in contact with said stop pins.

Under normal conditions, the inner portion and the outer portion of the wheel will be slightly eccentric to each other, due to the weight of the load. When a stone or other obstacle is struck the heaviest pressure is usually at the bottom of the tire or slightly in advance thereof. In the former and normal condition the springs undergoing the greatest tension will be the lowest ones, in the latter instance those just in advance of the lowest ones would receive the greatest shock. In either case a considerable amount of similar compression will be applied to the springs on each side of the point of shock or contact, such action being progressively less on both sides away from the point of contact or shock.

The levers act individually on the springs and are not linked together, but the compressive action is distributed by their arrangement around the wheel and the natural relative movements of the inner portion of the wheel and the outer or tire portion of the wheel with reference to each other, as these have inevitably somewhat of a floating quality and cannot transmit or apply pressure in a straight line only. The action of the springs is substantially radial and not in the direction of rotation nor laterally in any way, the helical springs beng radial or nearly radial in arrangement and the flat or leaf springs exerting their force in about the same direction.

In case the vehicle is started too suddenly, the circular arrangement of the independent levers and their springs will ease the jar on all sides and permit the wheel to run easily.

Having thus described my invention, what I claim as new and desire to secure by Letters Patent is:

1. In combination with the inner portion and the outer portion of a resilient wheel, a series of cam-levers carried by said inner portion and approximately in line with the direction of rotation of the wheel when under pressure, each lever having a curvilinear recess in its outer side, a series of parts carried by the outer portion of said wheel and arranged for contact with the parts of the levers thus recessed, to turn said levers on their pivots inward toward the hub, a series of springs arranged between said levers and the inner portion of the wheel and resisting said parts by radial outward action on said levers.

2. In combination with the inner portion and the outer portion of a resilient wheel, a series of cam-levers carried by said inner portion, each lever having a curvilinear recess in its outer side, a series of rollers movable with the outer portion of the wheel, in contact with the recessed parts of said levers and traveling along the curves of the latter to turn said levers inward toward the hub, and a series of springs interposed between the inner portion of the wheel and said levers, each spring having its outer end set into a recess in the inner side of the proximate lever and acting radially outward thereon in opposition to the action of said rollers.

3. In combination with the inner portion and the outer portion of a resilient wheel, a series of cam-levers carried by said inner portion and having curvilinear recesses in their outer sides, a series of springs interposed between said inner portion and said levers and acting radially outward on the latter, but adapted to be compressed and to permit the levers to lie approximately in line with the direction of rotation of the wheel, a casing carried by said outer portion and overlapping the sides of said inner portion and rollers carried by said casing and in contact with the curvilinearly recessed parts of the levers to turn them inward toward the hub against the resistance of the springs as described.

4. In combination with the inner portion and the outer portion of a resilient wheel, a series of yoke plates fixed flat upon the periphery of the rim of said inner portion, each yoke plate being constructed to hold a pair of springs, a series of radially operating helical springs arranged in pairs and held by said yoke plates, a series of pairs of levers carried by the rim of said inner part, each pair of said levers being adapted to engage and be acted on by one of said pairs of springs, and parts carried by said outer portion of the wheel for contact with said levers to act against the resistance of said springs.

5. In combination with the outer portion and the inner portion of a resilient wheel, a series of brackets and a series of yoke plates, carried by said inner portion in alternate arrangement and adapted to have a pair of levers mounted in each bracket and a pair of springs on each yoke plate, a series of levers pivoted in said brackets and consisting of pairs extending in opposite directions, a series of pairs of helical springs, each pair being based on one of said plates and acting radially on the proximate ends of two levers of different pairs and a series of parts carried by said outer portion of the wheel and acting on said levers to compress said springs.

6. In combination with the inner portion and the outer portion of a resilient wheel, interposed levers in series, parts carried by said outer portion and acting to turn said levers, leaf springs and radially operating helical springs coöperating on said levers to resist the action of said parts, and yoke plates, each of which holds two of the helical springs in sockets of its face and also holds the middle part of a leaf spring between it and said inner portion, the said pair of helical springs and the two ends of the leaf spring acting correspondingly on two of said levers as set forth.

7. In combination with the inner portion and the outer portion of a resilient wheel, a plate held to the former portion, a leaf spring held by said plate between it and said inner portion and operative radially at both ends, a pair of cam-levers provided with rollers in contact with said ends and parts carried by the outer portion of said wheel and arranged to act on said levers in opposition to said spring.

8. In combination with the inner portion and the outer portion of a resilient wheel, a series of levers located in the space between them, a series of springs acting on said levers to resist the yielding of the wheel, a series of parts carried by the outer portion of said wheel and acting on said levers against said springs, and a series of stops distinct from said parts limiting the movement of said levers under the action on said springs.

9. In combination with the inner portion and the outer portion of a resilient wheel, a series of removable brackets attached to said inner portion at intervals around its periphery, a corresponding series of pairs of levers pivoted to said brackets and extending longitudinally in opposite directions approximately in the line of rotation of the wheel when they are under pressure, means carried by the outer portion for acting on said levers, springs resisting such action on said levers, and rods arranged to engage said levers to limit their movement under the action of the springs.

10. In a resilient wheel having a relatively inner portion and outer portion, a detachable bracket carried by said inner portion and comprising a base part and two parallel walls, in combination with a pair of spring-pressed levers pivoted between said walls, extending longitudinally in opposite directions and arranged to receive pressure transmitted from the outer portion of the wheel, and a transverse rod attached at its ends to the middle parts of said walls and arranged to be engaged by said levers and limit their movement under the spring action.

11. A resilient wheel provided with levers and radially operating springs combining to resist the shock when an obstacle is encountered, said levers being pivoted to detachable brackets, each of which carries two levers, said springs being held by detachable yoke plates flat on the inner portion of said wheel arranged alternately with respect to said brackets in circular series and the springs of each yoke being arranged to act radially outward on two of said levers.

12. A resilient wheel provided with a circular series of levers and springs acting to sustain the weight carried by said wheel and absorb the shock of an obstruction, and movable devices in contact with said levers for actuating them under the resistance of such obstruction or the pressure of the weight of the load, and a series of stops independent of said devices, each of which is arranged for contact with two of said levers at the extreme movement of said levers under the action of said springs, but leaving the levers free to yield to the shock and pressure of any obstruction encountered and the weight of the load.

13. A resilient wheel consisting of a relatively movable outer portion and inner portion provided with a circular series of individually acting levers unconnected with each other and carried by said inner portion, a circular series of springs also carried by said inner portion and acting radially outward on said levers, and a circular series of removable means of attachment of said levers and springs to the inner portion of said wheel, the said springs and levers being arranged to receive and absorb pressure and jar transmitted from the outer portion of the wheel.

14. In a resilient wheel having an inner portion and an outer portion, an exterior casing attached to said outer portion and comprising two parallel annular walls, each wall surrounding a central opening and being composed of detachable segmental sections, each of which has a groove filled with packing on its inner face at the edge of said opening, so that each wall has on its inner face a continuous circular packing groove filled with packing immediately surrounding the said opening, the sides of the inner portion of the wheel being provided with side bearing plates in contact with said packing, for the exclusion of dust, moisture and other foreign matter.

In testimony whereof, I have signed my name to this specification in the presence of two subscribing witnesses.

WILLIAM W. WILLSON.

Witnesses:
A. H. JOHNSON,
J. M. SCHOOLER.

Copies of this patent may be obtained for five cents each, by addressing the "Commissioner of Patents, Washington, D. C."